(12) United States Patent
Gaal et al.

(10) Patent No.: US 8,516,350 B2
(45) Date of Patent: Aug. 20, 2013

(54) DATA ENCODING METHOD AND APPARATUS FOR FLASH-TYPE SIGNALING

(75) Inventors: Peter Gaal, San Diego, CA (US); Yongbin Wei, San Diego, CA (US); Sind Naga Bhushan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1273 days.

(21) Appl. No.: 11/830,712

(22) Filed: Jul. 30, 2007

(65) Prior Publication Data
US 2008/0168337 A1 Jul. 10, 2008

Related U.S. Application Data

(60) Provisional application No. 60/833,941, filed on Jul. 28, 2006, provisional application No. 60/841,361, filed on Aug. 30, 2006, provisional application No. 60/843,111, filed on Sep. 9, 2006.

(51) Int. Cl.
*H03M 13/00* (2006.01)
*H03M 13/03* (2006.01)

(52) U.S. Cl.
USPC .......................................... 714/784; 714/790

(58) Field of Classification Search
USPC ................ 714/784, 790, 822, 776, 752, 701, 714/755, 786, 746, 713, 714; 375/265, 295; 370/335, 336, 337
See application file for complete search history.

(56) References Cited

U.S. PATENT DOCUMENTS

| | | | | |
|---|---|---|---|---|
| 5,517,511 A | * | 5/1996 | Hardwick et al. | 714/755 |
| 6,553,538 B2 | * | 4/2003 | Zehavi | 714/784 |
| 7,110,349 B2 | * | 9/2006 | Branlund et al. | 370/203 |
| 7,460,608 B2 | * | 12/2008 | Cameron et al. | 375/265 |
| 2002/0039355 A1 | | 4/2002 | Yun et al. | |
| 2004/0057441 A1 | | 3/2004 | Li et al. | |
| 2006/0013168 A1 | * | 1/2006 | Agrawal et al. | 370/335 |
| 2008/0181170 A1 | * | 7/2008 | Branlund et al. | 370/328 |

FOREIGN PATENT DOCUMENTS

| | | |
|---|---|---|
| EP | 1528829 | 5/2005 |
| JP | 2000031936 A | 1/2000 |
| JP | 2000269918 | 9/2000 |
| JP | 2003158499 | 5/2003 |
| JP | 2004187257 A | 7/2004 |
| JP | 2007510354 | 4/2007 |

(Continued)

OTHER PUBLICATIONS

Jia, Y. et al. :"An SDMA Approach with Preamble Subcarrier Assignment for IEEE 802. 11a-based OFDM Signals." IEICE Transactions on Communications, Communications Society, Tokyo, JP, vol E88-B, No. 10, Oct. 2005, pp. 4133-4137, XP001234419, ISSN: 0916-8516.

(Continued)

*Primary Examiner* — Phung M Chung
(74) *Attorney, Agent, or Firm* — Kristine U. Ekwueme

(57) ABSTRACT

Embodiments disclosed herein relate to preamble configuration in wireless communication systems (e.g., UHDR-DO type systems). Disclosed embodiments disclose receiving a plurality of information bits, generating a plurality of preamble codewords based on a determined a set of monitored MAC_IDs, correlating the information bits with each of the plurality of preamble codewords, determining if a maximum correlation value exceeds a threshold, and transmitting at least one of the preamble codewords if the threshold is exceeded.

23 Claims, 20 Drawing Sheets

(56) References Cited

FOREIGN PATENT DOCUMENTS

| JP | 2007526716 A | 9/2007 |
| --- | --- | --- |
| KR | 10383618 | 5/2003 |
| KR | 20050041801 A | 5/2005 |
| WO | 0209455 | 1/2002 |
| WO | WO0209455 | 1/2002 |
| WO | WO03024000 | 3/2003 |
| WO | 2006006440 A1 | 1/2006 |
| WO | WO2006046307 A1 | 5/2006 |

OTHER PUBLICATIONS

Todorvic, B.M.: "Code Acquisition Scheme for Frequency Hopping Radio in Channels with Fading," Electronics, Letters, IEE Stevenage, BG, vol. 33, No. 3, Jan. 30, 1997, pp. 178-179, XP006007026, ISSN: 0013-5194.

Kim K.S. et al.: "A Preamble-Based Cell Searching Technique for OFDM Celiuiar Systems," Vehicular Technology Conference, 2003. VTC 2003-FALL. 2003 IEEE 58th Orlando, FL, USA, Oct. 6-9, 2003, Piscataway, NJ, USA, IEEE. US, Oct. 6, 2003, pp. 2471-2475, XP010702613, ISBN: 0-7803-7954-3.

International Search Report, PCT/US2007/074775—International Searching Authority—European Patent Office—Apr. 24, 2008.

Written 0pinion, PCT/US2007/074775—International Searching Authority—European Patent Office—Apr. 24, 2008.

International Preliminary Report on Patentability—PCT/US07/074775, International Search Authority—The International Bureau of WIPO—Geneva, Switzerland—Feb. 3, 2009.

L.Eggert "Re: CFR: bridge locking",FreeBSD-arch, Aug. 20, 2003,pp. 1-2,Retrieved from:<http://unix.derkeiler.com/Mailing-Lists/FreeBSD/arch/2003-08-0071.html>.

Taiwan Search Report—TW096127862—TIPO—Mar. 26, 2012.

\* cited by examiner

| $a_1$ | $a_0$ | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ |
|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 | 16 |
| 0 | 14 | 15 | 3 | 30 | 28 | 23 | 17 | 9 | 21 | 14 | 1 | * | 2 | 16 | 24 | 13 | 22 |
| 1 | 2 | 3 | 24 | 9 | 20 | 19 | 10 | 14 | 29 | 17 | 13 | 11 | 6 | 0 | 23 | 4 | 28 |

702

| $a_1$ | $a_0$ | $c_{16}$ | $c_{17}$ | $c_{18}$ | $c_{19}$ | $c_{20}$ | $c_{21}$ | $c_{22}$ | $c_{23}$ | $c_{24}$ | $c_{25}$ | $c_{26}$ | $c_{27}$ | $c_{28}$ | $c_{29}$ | $c_{30}$ | $c_{31}$ |
|---|---|---|---|---|---|---|---|---|---|---|---|---|---|---|---|---|---|
| 0 | 0 | 17 | 18 | 19 | 20 | 21 | 22 | 23 | 24 | 25 | 26 | 27 | 28 | 29 | 30 | 0 | * |
| 0 | 14 | 29 | 4 | 7 | 12 | 25 | 11 | 8 | 18 | 20 | 10 | 26 | 6 | 5 | 27 | 0 | 19 |
| 1 | 2 | 15 | * | 16 | 30 | 7 | 27 | 5 | 12 | 18 | 21 | 26 | 8 | 25 | 22 | 1 | 2 |

| GF(32) Element | $\alpha$ | $\alpha^2$ | $\alpha^3$ | $\alpha^4$ | $\alpha^5$ | $\alpha^6$ | $\alpha^7$ | $\alpha^8$ |
|---|---|---|---|---|---|---|---|---|
| Tone Index in Tile | 2 | 3 | 4 | 5 | 4 | 6 | 7 | 8 |
| BPSK Symbol | + | + | + | + | - | + | + | + |

| GF(32) Element | $\alpha^9$ | $\alpha^{10}$ | $\alpha^{11}$ | $\alpha^{12}$ | $\alpha^{13}$ | $\alpha^{14}$ | $\alpha^{15}$ | $\alpha^{16}$ |
|---|---|---|---|---|---|---|---|---|
| Tone Index in Tile | 9 | 6 | 10 | 11 | 12 | 2 | 13 | 7 |
| BPSK Symbol | + | - | + | + | + | - | + | - |

| GF(32) Element | $\alpha^{17}$ | $\alpha^{18}$ | $\alpha^{19}$ | $\alpha^{20}$ | $\alpha^{21}$ | $\alpha^{22}$ | $\alpha^{23}$ | $\alpha^{24}$ |
|---|---|---|---|---|---|---|---|---|
| Tone Index in Tile | 14 | 14 | 8 | 11 | 15 | 13 | 10 | 9 |
| BPSK Symbol | + | + | - | - | + | - | - | - |

| GF(32) Element | $\alpha^{25}$ | $\alpha^{26}$ | $\alpha^{27}$ | $\alpha^{28}$ | $\alpha^{29}$ | $\alpha^{30}$ | $\alpha^{23}$... | |
|---|---|---|---|---|---|---|---|---|
| Tone Index in Tile | 5 | 16 | 15 | 3 | 16 | 12 | 1 | 0 |
| BPSK Symbol | - | + | - | - | - | - | + | - |

FIG. 8

| k | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| j | 16 | 11 | 8 | 4 | 15 | -4 | 6 | 13 | 14 | 1 | -6 | 10 | 9 | 5 | -11 | 3 |

902 → k row, 904 → j row

| k | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| j | -13 | 2 | -2 | -14 | -9 | 12 | -3 | -10 | -1 | -15 | 7 | -12 | -8 | -7 | -5 | -16 |

902 → k row, 904 → j row

FIG. 9

DATA ENCODING METHOD AND APPARATUS FOR FLASH-TYPE SIGNALING

REFERENCE TO CO-PENDING APPLICATIONS FOR PATENT

The present application for patent is related to the following U.S. patent applications:

Provisional Ser. No. 60/833,941, entitled "METHOD AND APPARATUS FOR PREAMBLE CONFIGURATION IN WIRELESS COMMUNICATION SYSTEMS," filed Jul. 28, 2006, Provisional Ser. No. 60/841,361, entitled "DATA ENCODING METHOD AND APPARATUS FOR FLASH-TYPE SIGNALING" filed Aug. 30, 2006, Provisional Ser. No. 60/843,111, entitled "DATA ENCODING METHOD AND APPARATUS FOR FLASH-TYPE SIGNALING," filed Sep. 9, 2006 and assigned to the assignee hereof, and expressly incorporated by reference herein.

BACKGROUND

1. Field

This disclosure relates generally to communication systems. More specifically, embodiments disclosed herein relate to data encoding for flash-type signaling in wireless communication systems.

2. Background

Wireless communication systems are widely deployed to provide various types of communication (e.g., voice, data, multimedia services, etc.) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, W-CDMA, TD-SCDMA, and other standards.

Orthogonal frequency division multiplexing (OFDM) technology has attracted considerable attention in wireless communications, as a multi-tone modulation and multiple access technique to enhance the channel capacity and mitigate multiple access interference. As the demand for high-rate and multimedia data services rapidly grows, there lies a challenge to implement efficient and robust OFDM communication systems.

BRIEF DESCRIPTION OF THE DRAWINGS

FIG. 7 illustrates an example of codewords of an extended Reed-Solomon code;

FIG. 8 illustrates an example of a map according to the present disclosure;

FIG. 9 illustrates an example of a lookup table according to the present disclosure;

DETAILED DESCRIPTION

Embodiments disclosed herein relate to preamble configuration in wireless communication systems.

Figure 1:
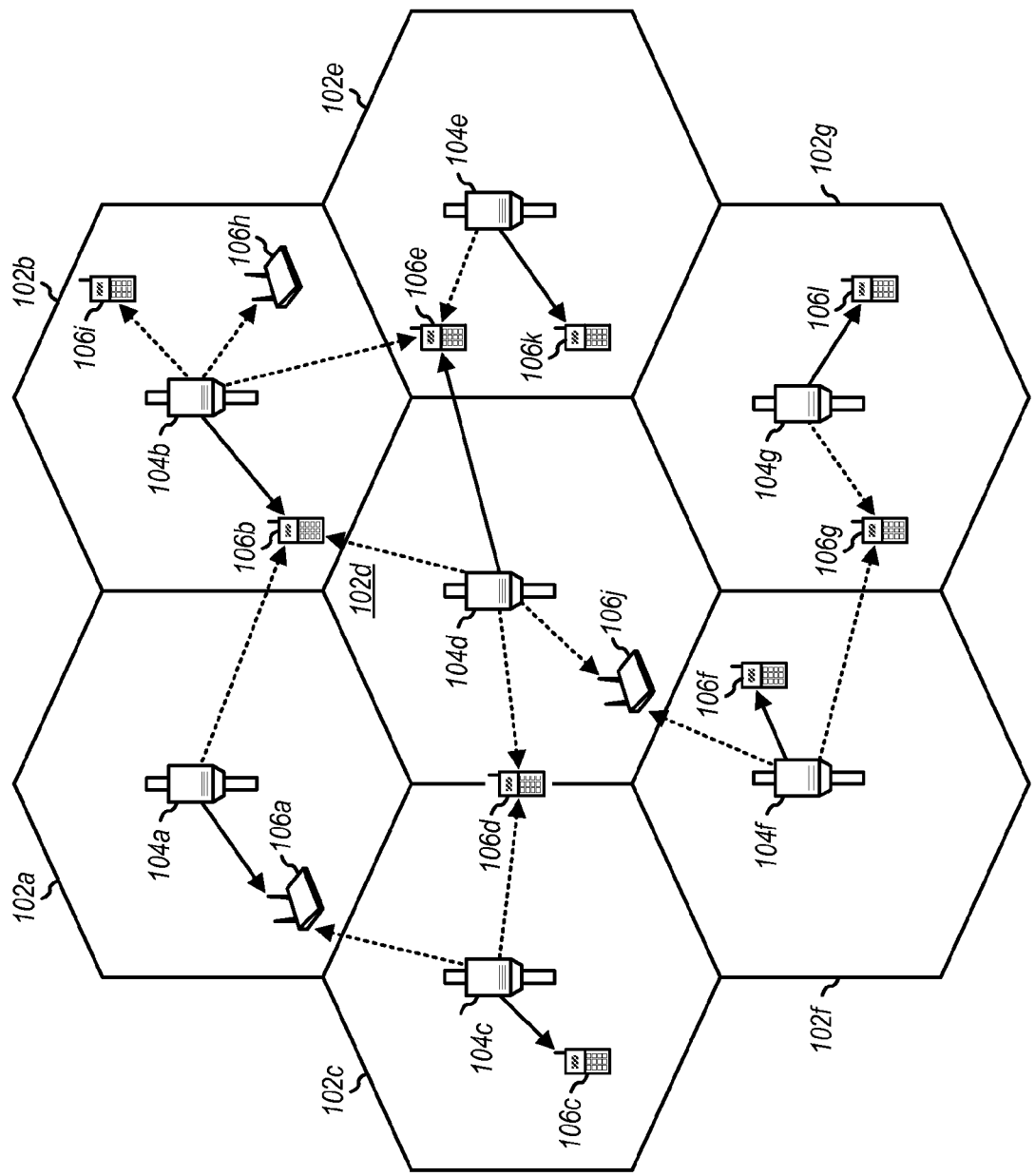
FIG. 1 illustrates a wireless communication system.

FIG. 1 illustrates a wireless communication system 100 configured to support a number of users, in which various disclosed embodiments and aspects may be implemented, as further described below. By way of example, system 100 provides communication for a number of cells 102, including cells 102a-102g, with each cell being serviced by a corresponding Access Point (AP) 104 (such as APs 104a-104g). Each cell may be further divided into one or more sectors. Various Access Terminals (ATs) 106, including ATs 106a-106k, are dispersed throughout the system. Each AT 106 may communicate with one or more APs 104 on a forward link (FL) and/or a reverse link (RL) at a given moment, depending upon whether the AT is active and whether it is in soft handoff, for example.

In a high rate packet data (HRPD) system (e.g., as specified in "cdma2000 High Rate Packet Data Air Interface Specification," 3GPP2 C.S0024-A, Version 2.0, July 2005; "cdma2000 High Rate Packet Data Air Interface Specification," 3GPP2 C.S0024-B, Version 1.0, May 2006; and other related specifications, referred to herein as a "1xEV-DO" (or "DO") type system), transmission on forward link is partitioned into a sequence of frames; each frame is further divided into time slots (e.g., 16 slots each with a duration of 1.667 msec); and each slot includes a plurality of time-division-multiplexed channels.

Figure 2:
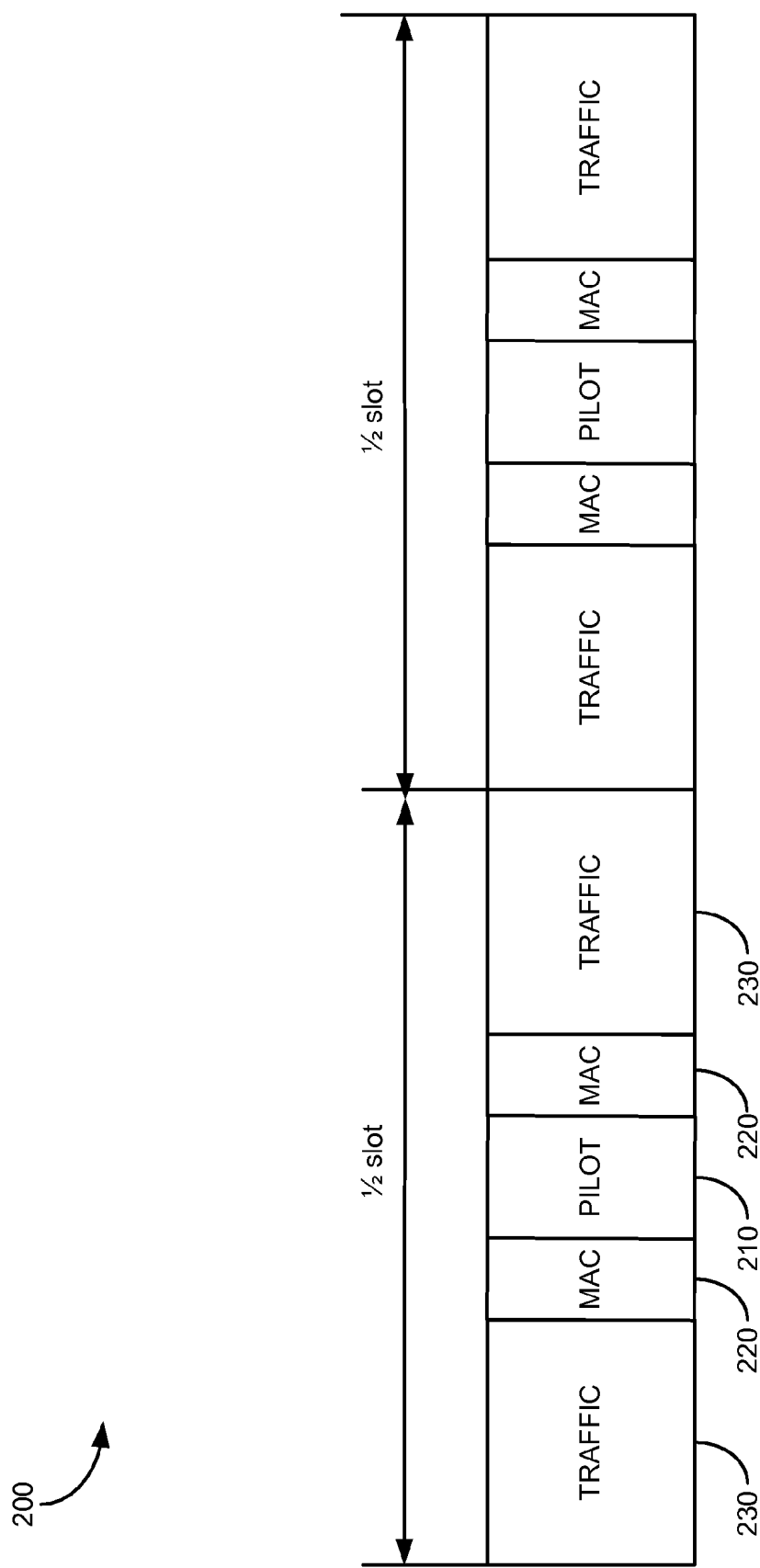
FIG. 2 illustrates an example of a forward link slot structure.

By way of example, FIG. 2 illustrates an embodiment of a forward link slot structure 200, such as employed in a 1xEV-DO type system. Time slot 200 is divided into two half-slots, with each half-slot having the following channel assignments: pilot channel 210, forward medium access control (MAC) channel 220, and forward traffic (or control) channel 230. Pilot channel 210 carries the pilot signal (also commonly termed as the pilot) used by an AT (such as AT in FIG. 1) for initial acquisition, phase recovery, timing recovery, radio combining, as well as estimating the channel conditions on forward link (e.g., by way of the signal-to-noise-and-interference (SINR) measurement). MAC channel 220 sets forth the procedures used to receive and transmit over the physical layer (which provides the channel structure, frequency, power output, modulation, encoding specifications for forward and reverse links). Traffic channel 230 may carry information or data (e.g., by way of physical layer packets). Traffic channel 230 may also be used to carry control messages, e.g., a preamble identifying the AT for which the subsequent transmission is intended or indicating a multi-user packet. Further, pilot channel 210, MAC channel 220, and traffic channel 230 are time-division-multiplexed within time slot 200.

In some wireless communication systems (e.g., ultra high data rate DO (UHDR-DO) type systems), OFDM may be employed as a multiple tone modulation and multiple access technique on the forward link, to enhance the channel capacity and mitigate multiple access interference. For example, traffic channel 230 in time slot 200 may comprise multiple OFDM tones. In flash-type signaling, a strong signal may be sent on a small subset of the available tones. This is superimposed on the normal usage of tones for data traffic. The superimposed tones may be decoded in a non-coherent fashion, in which case the tone position (in frequency and/or time) alone carry the signaling or acquisition information. Embodiments herein disclose methods to map signaling codewords to tone indices. The following properties are desirable for such mappings: A) large number of available codewords with the fewest number of occupied tones; B) good minimum distance, i.e. small number of common tone indices between any pair of codewords; C) good diversity, i.e. the utilized tones should be reasonably spread out across the spectrum for any given codeword; D) close to uniform weight distribution amongst the codewords so that transmit power may be efficiently managed; E) relatively easy systematic encoding and decoding.

Figure 3:
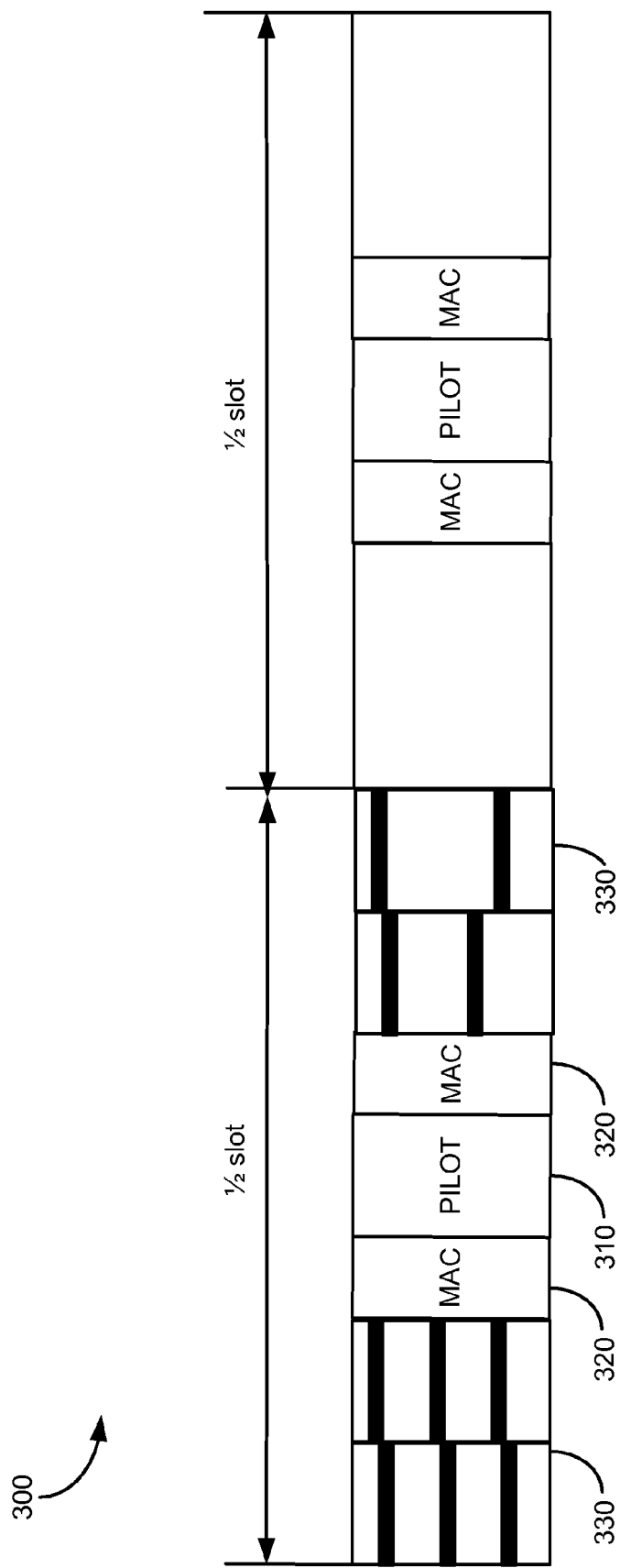
FIG. 3 illustrates another example of a forward link slot structure.

FIG. 3 illustrates an embodiment of a forward link slot structure 300, which may be employed in a UHDR-DO type system. Time slot 300 is shown in two half-slots, each having pilot channel 310, MAC channel 320, and traffic channel 330 in a time-division-multiplexed format. Traffic channel 330 may comprise multiple OFDM tones. Furthermore, one or more OFDM tones may be selected to carry a preamble, such as illustrated by the shaded areas in FIG. 3. (For clarity and illustration, only one half-slot is shown explicitly with OFDM tones.) The preamble may be configured to identify the AT for which the subsequent transmission is intended (or indicate a multi-user packet), indicate the packet format associated with the subsequent transmission, etc.

In some embodiments, OFDM tones for the preamble (or "preamble tones") may be placed in the first half of a time slot. Preamble tones may be divided into disjoint sets, each set containing a predetermined number of tones.

In some embodiments, the preamble may be divided into a plurality of streams, e.g., for OFDM tone selection and for tone modulation. In an embodiment, the preamble (e.g., having 10 bits) may be divided into a first stream having a number of most significant bits (MSBs) of the preamble information and a second stream having a number of least significant bits (LSBs) of the preamble information. The first stream may be used for tone set selection, and the second stream may be encoded using a particular error control coding scheme (e.g., bi-orthogonal code, pseudo random codebook, etc.). Discrete Fourier Transform (DFT) precoding (or other unitary transformations) may also be utilized in some applications. The two preamble streams may then be combined for OFDM tone mapping and modulation.

In some embodiments, the preamble may be adaptive to the channel condition, so as to ensure satisfactory reception at the receiver (e.g., an AT). In an embodiment, for example, the number of OFDM tones selected for a preamble may be adaptive to the channel's signal-to-interference-and-noise ratio (SINR). In other embodiments, the power for transmitting the preamble tones (e.g., a fixed number of ones) may be adaptive to the channel's SINR.

In some embodiments, the preamble may include a MAC ID and a rate adjustment field. For example, the preamble frame may include 10 bits, where 8 bits are allocated to the MAC ID and 2 bits to the rate adjustment field. In a UHDR-DO type system, the preamble is used in a current DO to indicate which AT(s) are scheduled on the FL. In one example, a UHDR-DO preamble frame has 10 bits, an 8 bit MAC_ID and a 2 bit compatible rate field, indicating the adjusted data rate related to DRC feedback. The 2 bit compatible rate field reduces the burden at an AT to perform multiple decodings and allow the AN to overwrite DRC feedback even when DRC value is high. The UHDR-DO preamble is embedded in OFDM symbols. In some embodiments, a half-slot of a forward link employed in a UHDR-DO type system may have a number of tiles available, each tile having a number of tones, and at least one tone per tile being used to transmit a preamble. In other words, the total number of available tones in a half slot may be divided into "M" tiles of size $2^m$, wherein the total number of tones is at least $M*2^m$.

Figure 4:
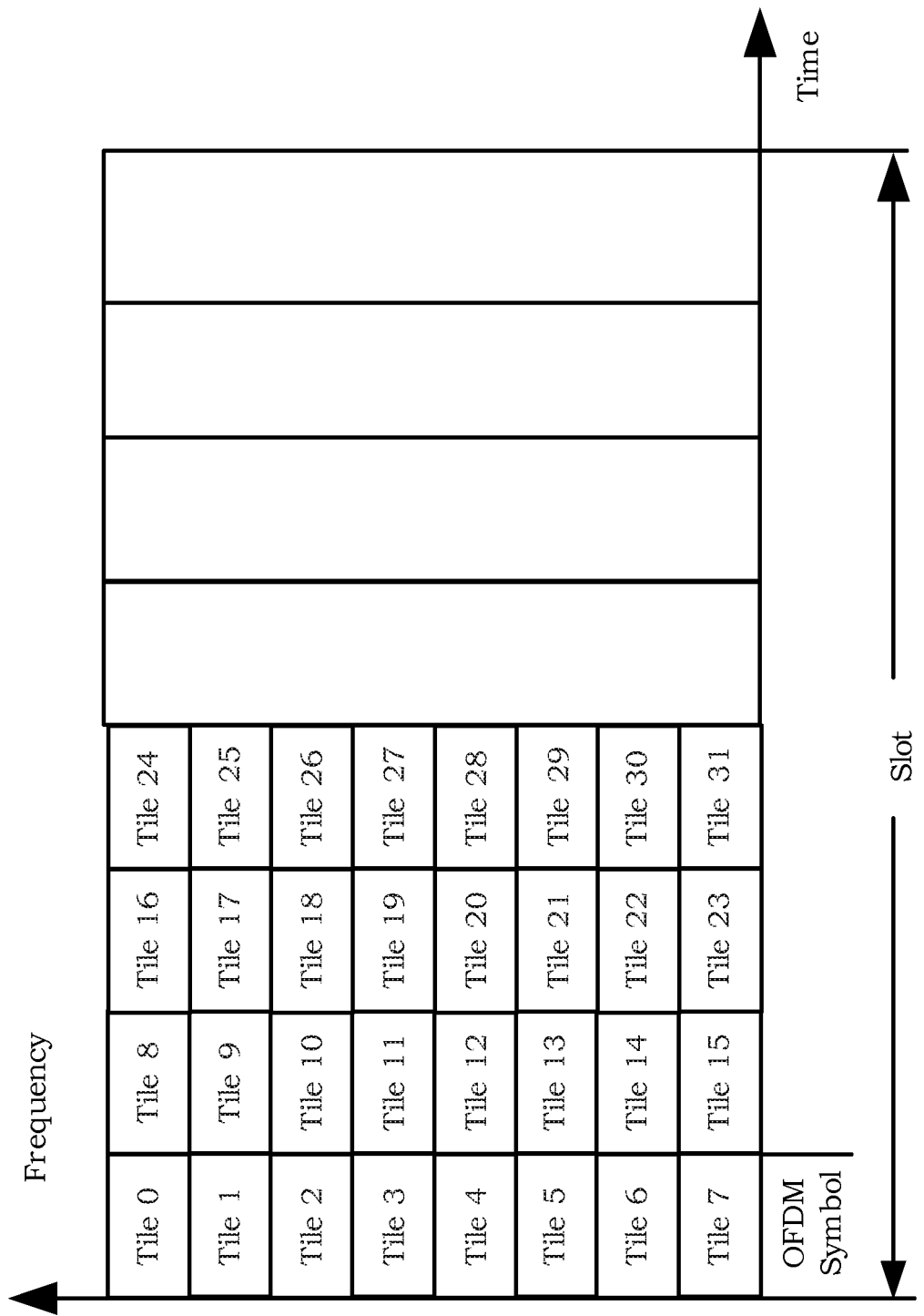
FIG. 4 illustrates another example of a forward link slot structure.

FIG. 4 illustrates an example of a forward link structure 300 having two half-slots, the first half slot has thirty-two tiles, numbered 0 through 31, and each tile has sixteen tones. Put differently, there are four OFDM symbols in the first half slot. In each OFDM symbol, 128 tones are available for preamble (after exclusion of all tones that may be used for pilot). The 128 tones may be split into eight groups or eight tiles, numbered 0 through 7 for instance. Thus, there are a total of thirty-two tiles in the first half slot, wherein each of the eight tiles contains sixteen almost contiguous tones. The total number of tones in the first half-slot is at least $32*2^4$. In one example, one of the sixteen tones per tile may be used to transmit preamble information to an AT. In FIG. 4, pilot tones and skipped tones are not shown.

In some embodiments, error control coding such as a Reed Solomon coding may be used to determine the position location of a tone. For instance, k*m input bits may be represented as k GF($2^m$) symbols which are input to a (n, k) Reed Solomon code in GF($2^m$). The output of the Reed Solomon code is represented as $s_0, s_1, \ldots s_{n-1}$. Each output code symbol $s_i$ with i=0, 1, ..., n−1 is represented as $p_i$ in decimal format, where $p_i$ ranges from 0 to $2^m-1$. Here, $p_i$ gives the tone location in the i-th tile that may be used to transmit preamble information to an AT.

In an embodiment, the number of available resource blocks (time and/or frequency) may be grouped into diversity groups. In each group, there should be $2^m$ tones for some m. For example, assume there are 1024 useable tones, in two consecutive time slots, with 512 tones in each slot. Then, from the 1024 tones, 16 diversity groups may be formed with 64 tones in each group. The 64 possible tone indices within each group may be mapped to the elements of GF($2^6$). Across the 16 groups, an (n, k, d)=(16, k, 16−k+1) Reed-Solomon code is formed. Then, the input k*6 information bits are mapped to a 16 symbol codeword and each symbol in turn is mapped to one of the indices in the range [0 . . . 63]. The tone corresponding to that index is set within each group to form the transmitted signal. Further encoding such as BPSK, QPSK etc may be applied if coherent demodulation can be applied.

In some embodiments, some additional input bits may be encoded to generate M modulation symbols. The M modulation symbols are transmitted on the selected tones within each tile. For instance, where a preamble frame has 10 bits with 8 allocated to a MAC ID and 2 bits allocated to a rate adjustment field, the 8 MAC ID bits may be input to an error control code e.g. Reed Solomon code and used to determine the position location of each tone in each tile. The 2 bit rate adjustment field may be encoded and the encoded symbols are mapped to, and transmitted on the selected tones.

Figure 5:
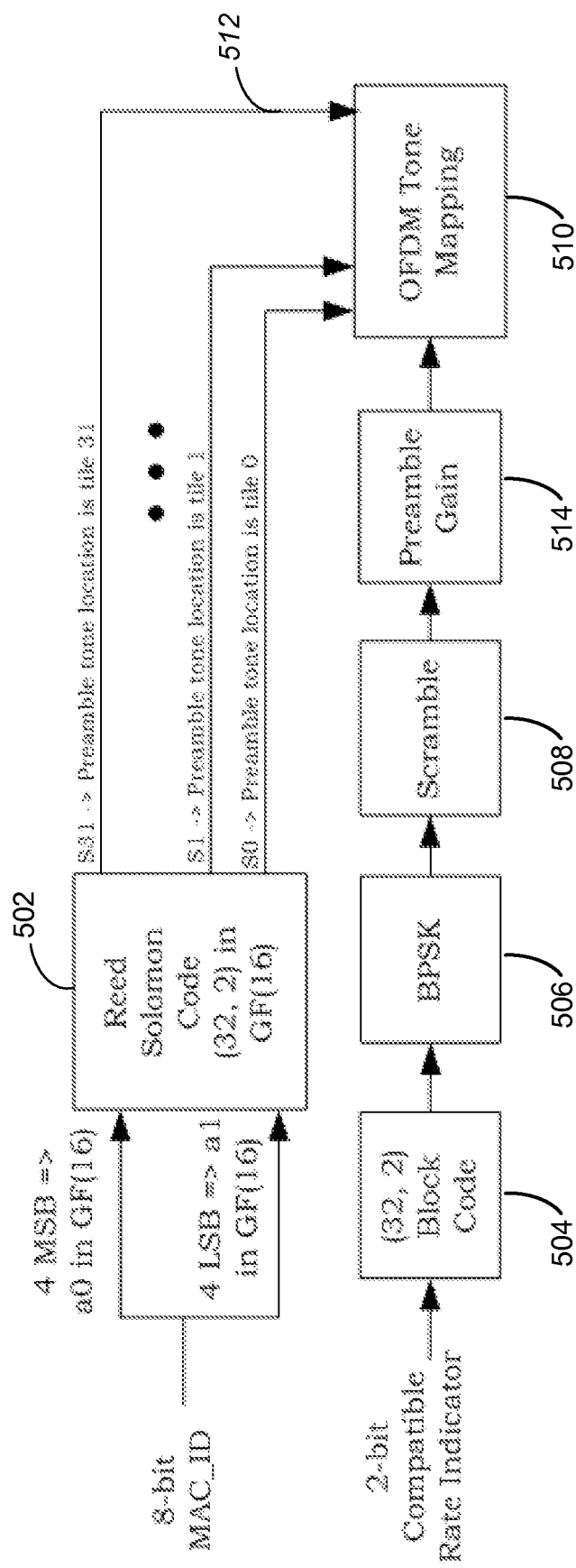
FIG. 5 illustrates an example of preamble design.

FIG. 5 illustrates an example of preamble design based on a GF (16) code. An 8 bit MAC_ID may be split into two 4 bit parts, wherein the first 4 most significant bits (MSBs) are represented as one GF(16) symbol, a.sub.0, and the 4 least significant bits (LSBs) are represented as one GF(16) symbol, $a_1$. Here, $a_0$ and $a_1$ are input to an appropriate (32, 2) m-ary code 502. Alternatively, $a_0$ and $a_1$ may be input to a (16, 2) parity extended Reed-Solomon code in GF(16) and the output of the extended Reed-Solomon code may be repeated once to give 32 symbols. As illustrated, the Reed-Solomon code with repetition outputs 32 GF(16) symbols, $s_0, s_1, \ldots s_{31}$. $S_i$ with $i=0, 1, \ldots, 31$ is represented as $p_i$ in decimal format, where $p_i$ ranges from 0-15. $P_i$ gives the tone location in the i-th tile that may be used to carry preamble for the AT. In another aspect, the 8 bit MAC_ID may be scrambled by a time-varying pseudo noise (PN) sequence before it is input to the Reed-Solomon code. The PN sequence generation method is known to both the AP and AT, therefore both may generate the same PN sequence. Applying the PN sequence is equivalent to randomly permuting the MAC_ID allocation among ATs, thus preventing the static reoccurrence of codeword pairs with distances below average.

Figure 5A:
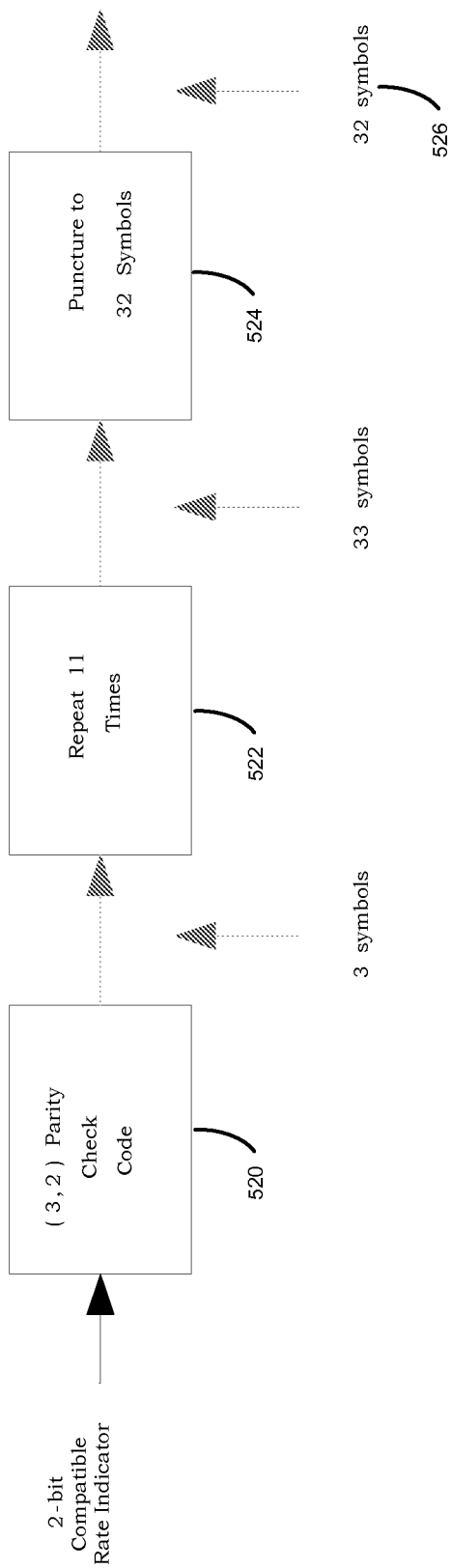
FIG. 5a illustrates an example of block code design.

As illustrated in FIG. 5, a 2 bit compatible rate field is encoded via a (32, 2) block code 504. The encoded symbols are scrambled 508, BPSK modulated 506, and mapped 510 to the 32 tones output 512 from the Reed-Solomon code 502. In this example, one tone in each tile is used. An example of block code (32, 2) is illustrated further in FIG. 5a, where a simple (3, 2) parity check code 520 is employed. An example (3, 2) parity check code C is given below $$C = \begin{bmatrix} 0 & 0 & 1 & 1 \\ 0 & 1 & 0 & 1 \\ 0 & 1 & 1 & 0 \end{bmatrix}$$

The output is repeated eleven times 522 and one of the output symbols, for example the last symbol, is punctured 524 to give 32 output symbols 526. An alternative to using a (32, 2) block code is pseudo-random and time varying the codebook from slot to slot. For example, a 35 bit AT specific PN sequence may be generated at the beginning of each slot. Bit n.about.(n+32) of the sequence may form the n-th codeword with n=0, 1, . . . , 31. The AT's PN scrambling generator may thus be used for pseudo random codebook generation.

Figure 5B:
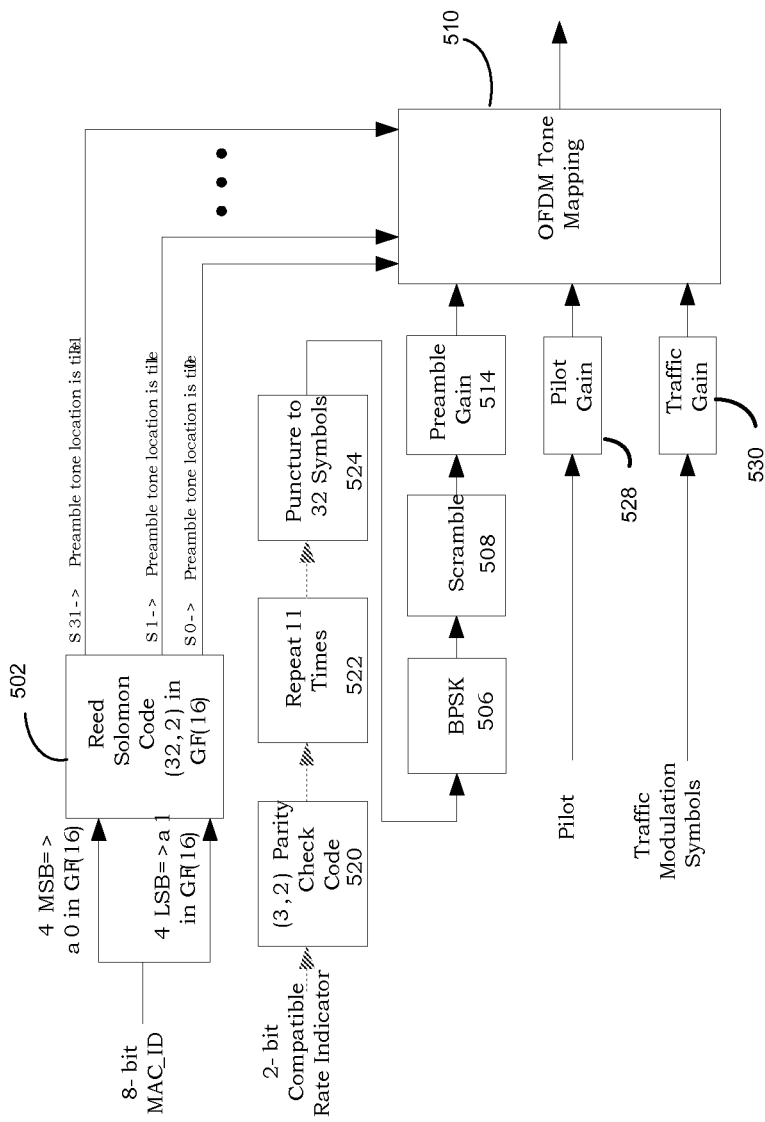
FIG. 5b illustrates another example of preamble design.

FIG. 5b illustrates an example of overall preamble design implementing (32, 2) Reed-Solomon code 502 in GF(16) and block code (32, 2) 504 as described above. Gain for the preamble 514, pilot 528 and traffic 530 is individually configurable. This allows for optimum power allocation for pilot 528, preamble 514 and traffic 530, thus minimizing both the probability of missed preamble information and the probability of traffic decoding errors.

Figure 5C:
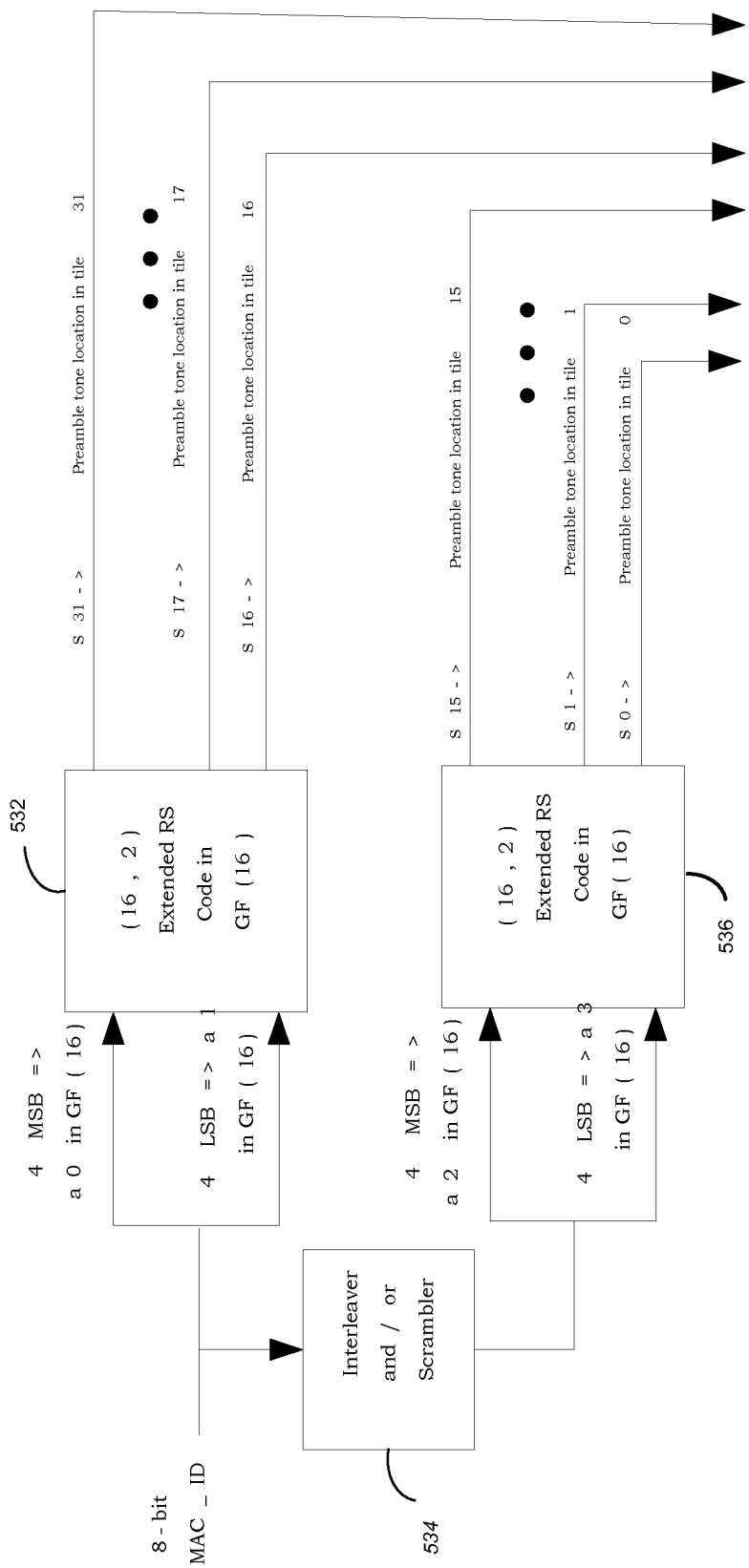
FIG. 5c illustrates another example of preamble design.

Another example of preamble design is illustrated in FIG. 5c. Here, an 8 bit MAC_ID is input to a first (16, 2) parity extended Reed-Solomon code 532. The same 8 bit MAC_ID is bit interleaved and/or scrambled 534 before being input to a second parity extended (16,2) Reed-Solomon code 536.

Figure 5D:
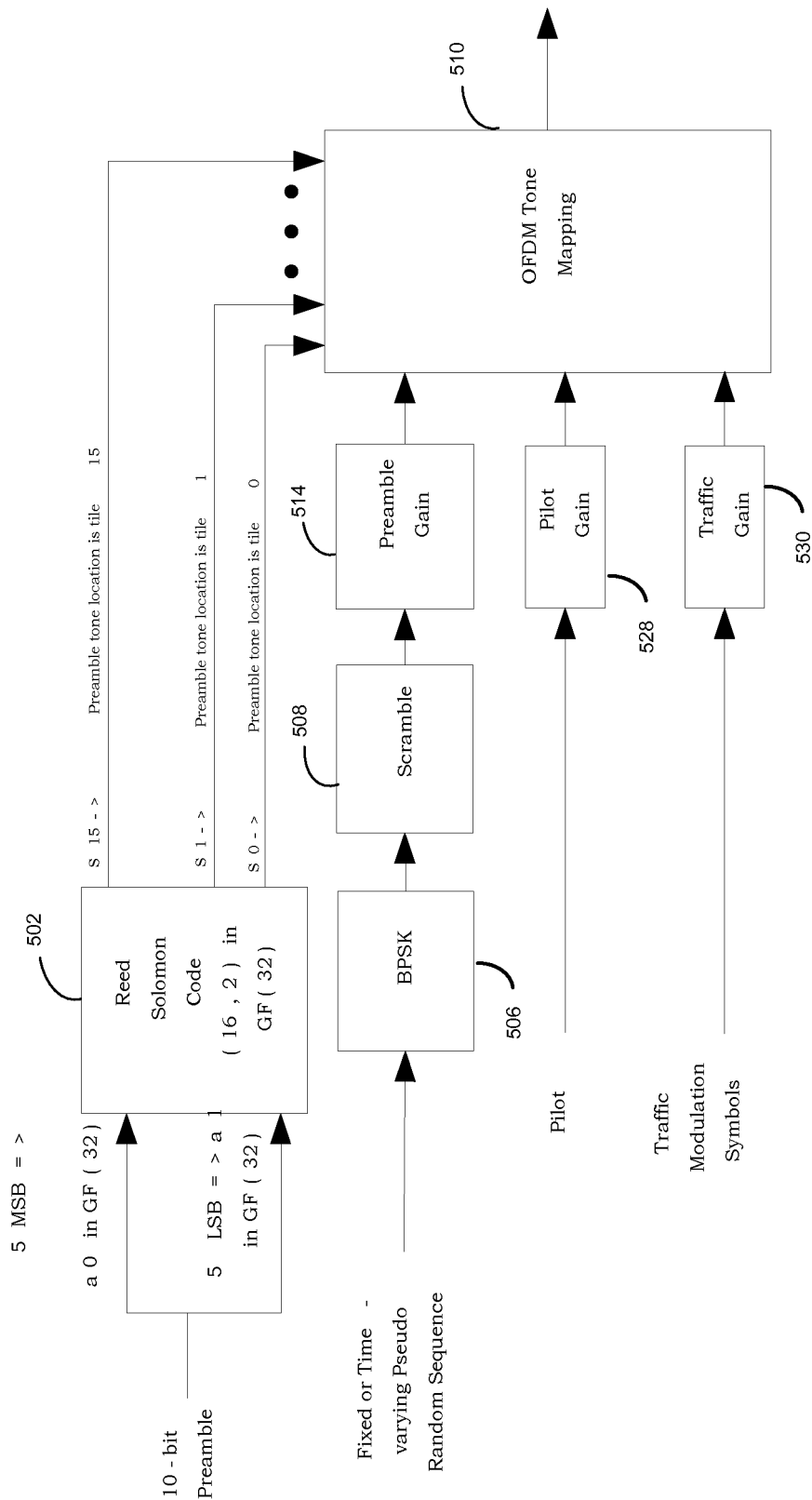
FIG. 5d illustrates another example of preamble design.

In examples discussed above, an 8 bit MAC_ID is used to select which tones are used to carry a preamble and a 2 bit compatible rate field is used to determine what sequence is transmitted on the selected tones. In alternate examples, all input bits may be used for tone selection. Decisions by the AT are based on the position of the tone as opposed to modulated information carried on the tone. For example, all 10 bits in the example above may be input to an error control code such as a Reed Solomon code 502 to determine the position location of tones. Symbols transmitted on the selected tones may be fixed or time-varying pseudo-random sequences representing information other than a 10 bit preamble frame. For example, symbols carried on the preamble tones may signal an "on" or "off" state of the preamble. FIG. 5d illustrates an example of preamble design wherein all input bits are used for tone selection. In FIG. 5d, the gain for the preamble 514, pilot 528 and traffic 530 is individually configurable.

In another example, tone locations in each tile may be selected pseudo-randomly using a pseudo random generator. The seed of the random generator may be a function of the AT's identifier (MAC_ID), cell site identifier (CELL_ID), and/or slot index. Random selection of tone location avoids collisions between AT's and different sectors. Fewer tones may be selected in this embodiment in order to minimize the tone collision probability. Tone collision probability as used herein refers to the relative frequency of the same tone being used in the preamble for two different ATs in the same sector or in neighbor sectors.

For any given number of tones used, the RS encoding ensures an optimum number of available codewords. The RS encoding has optimum minimum distance, and the distance is the same between any pair of codewords. As used herein, minimum distance refers to the minimum number of code symbols that are different between any pair of codewords. Also, good diversity is achieved because each group of tones will have one tone occupied, and the groups are spread out (in frequency and/or time). Every codeword has exactly n tones occupied, therefore every codeword requires the same transmit power. The receiver determines the maximum energy frequency bin in each diversity group and maps the maximum energy frequency bin to the raw received code symbols. There are known RS decoding algorithms that may be applied to the code symbols for error detection/correction. Alternatively, if the number of possible codewords for a given receiver is small, the receiver may determine all possible codewords and use a matched filter detector (for example, when a fixed MAC_ID is part of the signaling).

Figure 6:
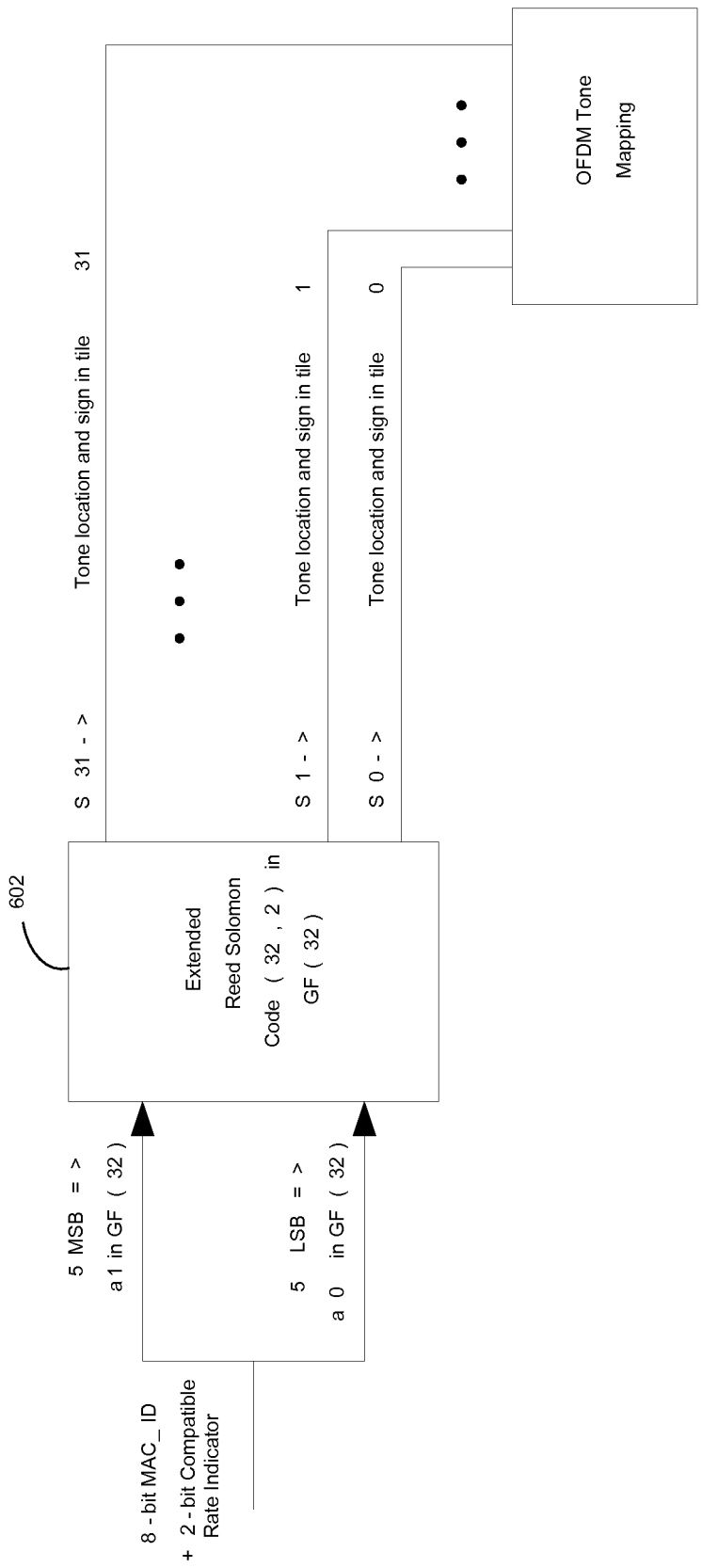
FIG. 6 illustrates an example of a modified preamble encoder architecture.

In some embodiments, improved cross-correlation of the preamble code is achieved, which results in reducing the expected false alarm rate. FIG. 6 illustrates an example of a modified preamble encoder architecture based on GF(32) code. The use of GF(32)-based codes enables the generation of the required length 32 codewords without any repetition. Also, the two constituent codes (for example MAC_ID and compatible rate) are unified in a single encoding scheme, therefore every preamble information bit will have the same level of error protection. The extended Reed Solomon code block 602 illustrated in FIG. 6 may be derived from a (31, 2) RS code with a single parity symbol extension, therefore creating a (32, 2) code. The underlying (31, 2) RS code is defined by its generating polynomial g(x), which may be written as:

$$g(x) = \prod_{i=1}^{29}(x+\alpha^i),$$

where $\alpha$ is a primitive element in GF(32). In the illustration, $\alpha$ may be chosen to be a root of polynomial $x^5+x^3+1$. Every codeword polynomial s(x) generated by g(x) may be given as $$s(x)=f(x) \cdot g(x), \text{ where } f(x)=a_1x+a_0, a_0, a_1 \in GF(32)$$

The coefficients $\{s_0, s_1, \ldots, s_{30}\}$ of s(x) form the actual Reed Solomon codeword. The extended Reed Solomon code is obtained by appending an extra parity code symbol, $s_{31}$, which is calculated as $$s_{31} = \sum_{i=0}^{30} s_i$$

Therefore, the extended Reed Solomon code is a (32, 2) code consisting of symbols that are elements of GF(32). FIG. 7 illustrates a few codewords of the extended Reed Solomon code. The table entries (except in the first row) show the exponents of the primitive element α 702 that correspond to the given finite field element. The symbol '*' 704 corresponds to the zero element in GF(32). If there are 32 tones in each tile, such as in the example illustrated in FIG. 5*d*, then the mapping of each of the GF(32) elements to one of the 32 tones is straightforward. However, when there are only 16 tones in each tile, such as in the example illustrated in FIG. 7, then a mapping from the GF(32) elements to the 16 tone indices within the tile may be established. This is a 2-to-1map. In order to distinguish the two GF(32) elements mapped to the same tone, a BPSK '+1' or '−1' symbol may be assigned to each of them. The BPSK symbol may be modulated on the corresponding OFDM tone in the transmitted codeword.

FIG. 8 illustrates one example of a map of GF(32) elements to tone indices. The tone index values 802 illustrated in FIG. 8 range from 1 to 16. Each index value occurs exactly twice in the table, once with BPSK symbol 804 '+' and once with BPSK symbol 804 '−'. As illustrated, the map establishes favorable cross-correlation among the preamble codewords because the cross-correlation between any pair of the resulting codewords is zero or negative. (As a reference, the GF(16)-based designs, such as shown in FIGS. 5*b* and 5*c*, have maximum cross-correlation of 1.) The non-positive pair-wise correlation corresponding to FIG. 8 allows for the arbitrary increase in preamble power without increasing the false alarm rate. Some loss of orthogonality may be expected due to frequency selectivity.

In an example, ten encoded information bits, 8 bit MAC_ID and 2 bit compatible rate indicator, are divided into two 5 bit blocks and a Reed-Solomon code with k=2, n=31 is employed. The code is extended by adding a 32nd symbol (parity), where $$s_{32} = \sum_{j=0}^{31} s_j$$

The available tones may be divided into 32 diversity groups, and each group contains 16 tones each. Trace-like mapping may be used from GF(32) symbols to the 16 tone indices. For any code symbol with exponent k 902 in GF(32), the tone index j 904 is obtained as alpha..sup.j=.alpha..sup.k+.alpha..sup.16k. Two k's are mapped to the same j:k.sub.1.fwdarw.j and k.sub.2.fwdarw.j if .alpha..sup.k.sup.−.sup.1+1=.alpha..sup.k.sup.−.sup.2.k.sub.1 and k.sub.2 are mapped to the same tone and assigned a BPSK +/− symbol arbitrarily and may be stored in a 31 element lookup table as illustrated in FIG. 9. In FIG. 9, GF(32) generating polynomial is assumed, wherein g(x)= x.sup.5+x.sup.3+1, and notation k=32.fwdarw.0 in GF(32); k=1.fwdarw.1in GF(32).

Reed-Solomon encoding ensures that, between any two codewords, there is at most a single same sign tone collision.

Mapping ensures that when there is a same sign collision, there is also an opposite sign collision. Thus, the cross-correlation is always zero or negative. A complete cross-correlation value distribution amongst all (1024*1023)/2 possible codeword pairs is as follows:

| X-Correlation Value | 0 | −32 |
|---|---|---|
| Number of Codeword Pairs | 523,264 | 512 |

In another aspect of the present disclosure, properties of mapping described above, are discussed herein. For example, there may be $2^{2m-1}$ dimensions, where m is a prime, grouped into $2^m$ equal sized 'tiles', each tile containing exactly $2^{m-1}$ dimensions. As an illustration, m=5. Thus, a codebook may be designed wherein:
1. The codebook size is $2^{2m}$ i.e. 2m information bits can be encoded (in our example, 10 bits)
2. The codewords have length $2^{2m-1}$
3. The code symbols are three-valued: they can be 0, +1, or −1
4. Each codeword has exactly one non-zero symbol in every tile
5. The pair-wise correlation between any codeword pair is zero or less In an embodiment, a (k=2, n=$2^{m-1}$) Reed-Solomon code based on m-bit symbols is used. The codewords of this code may be written as $$\{c_0, c_1, c_2, \ldots, c_{n-1}\} \text{ where } c_i \epsilon GF(2^m)$$

This may be referred to as "C". Next, code C may be extended by adding a (n+1)th code symbol (parity) to every codeword, obtained as $$c_n = \sum_{i=0}^{n-1} c_i$$

The extended code may be referred to as Ce.

In this example, a one-to-one mapping may be defined, which maps the elements of GF($2^m$) to integer pairs (a,b), where a$\epsilon\{1, 2, \ldots, 2^{m-1}\}$ and b$\epsilon\{+1, -1\}$. The purpose of this mapping is that each finite field element, and therefore each RS code symbol, is mapped to a particular tone within a tile and a BPSK symbol. The BPSK symbol is modulated onto the chosen tone in every tile to form the transmitted codeword. The unused tones are modulated with zero.

An arbitrary constant offset γ$\epsilon$GF($2^m$) may be used. If two elements α,β$\epsilon$GF($2^m$) satisfy α+γ=β then map α to (a,b)=(a, 1) and map β to (a,b)=(a,−1). In other words, element pairs that are constant offset γ apart are mapped to the same tone with opposite signs. The exact sign allocation or the exact tone allocation may be arbitrary. The distance properties of the codebook are invariant under permuting the tones or exchanging the sign, as long as the element pairing remains the same.

Any two non-identical codewords obtained with applying the above mapping to the extended RS code Ce has a maximum correlation of zero between them. Since the RS code already ensures that between any two codewords, there may be at most one tone collision with the same sign, it may be shown that in each of those collision cases there is also a tone collision with opposite signs between the same two codewords. Since the nature of the chosen mapping, and the fact that Ce is a linear code, it is sufficient to show that A) If a codeword in Ce, other than the all zero codeword, contains a code symbol equal to zero, then the same codeword should also contain at least one code symbol equal to γ.

If a codeword pair has a same sign tone collision then the sum of those two codewords, which is also a codeword in Ce, has a zero symbol in the corresponding position; and if a codeword pair has an opposite sign tone collision then the sum of those two codewords has a γ symbol in the corresponding position.

We can show something a little more general, which can be stated as follows:

B) Any codeword in Ce consists of either
- a single element of $GF(2^m)$ repeated $2^m$ times (call this Type I) or
- all elements of $GF(2^m)$. In this case, obviously each element of $GF(2^m)$ would occur exactly once in the given codeword (call this Type II)

If B) is true, then A) is also necessary true because of the following. Assume B) is true; then if a codeword is of Type I, then it is either the all zero codeword, or it has no zero elements, both of which cases are excepted from the conditions of A). On the other hand, if a codeword is of Type II, then it contains all elements of $GF(2^m)$, therefore it necessarily contains γ, so A) is satisfied.

It may be illustrated that B) is true by considering the properties of the underlying RS code C. The generating polynomial g(x) of C can be written as follows:

$$g(x) = \prod_{i=1}^{2^m-3} (x + \alpha^i)$$

where α is a chosen primitive element of $GF(2^m)$. Then every codeword c(x) can be given as $c(x)=f(x)\cdot g(x)$ where $f(x)=b_1 x+b_0$, $b_0, b_1 \in GF(2^m)$ Here, $b_0$ and $b_1$ are the information symbols representing the 2m information bits. Consider polynomial h(x) defined as $h(x)=x+\alpha^{-1}=x+\alpha^{2^m-2}$ and consider polynomial d(x) which is the product of the code polynomial c(x) and h(x).

$$d(x) = c(x)\cdot h(x) = f(x)\cdot g(x)\cdot h(x) = f(x)\cdot \prod_{i=1}^{2^m-2}(x+\alpha^i) =$$

$$f(x)\cdot \frac{x^{2^m-1}+1}{x+1} = f(x)\cdot \sum_{i=0}^{2^m-2} x^i = (b_0+b_1)\cdot \sum_{i=0}^{2^m-2} x^i$$

Looking at d(x), either d(x)=0 (when $b_0=b_1$), or else d(x) is a degree $2^m-2$ polynomial with constant coefficients. In either case, if $d(x)=c(x)\cdot h(x)$, h(x) represents a simple linear recursion between the consecutive elements of c(x), which may be given as follows:

$c_i+\alpha^{-1}\cdot c_{mod(i+1,2^m-1)}=b_0+b_1$ or written in a different form $c_{mod(i+1,2^m-1)}=\alpha\cdot(c_i+b_0+b_1)$ Due to the first degree linear recursion, if $c_i c_j$ then $c_{i+1}=c_{j+1}$ and so on, so the consecutive elements of a given codeword in C should form cycles under the recursion. Any cycle length should divide the number of elements in the cyclic multiplicative subgroup of $GF(2^m)$, which number is $2^m-1$. Since m is prime, $2^m-1$ is also prime, therefore the only possibilities for the cycle length is 1 or $2^m-1$. This means that the code symbols in any code word of C are either all identical or they are all distinct. This means that B) is true for at least code C.

If a codeword in C is of Type I, then all its code symbols are identical, for instance, $\lambda=c_0=c_1=\ldots=c_{n-1}$ In this case, the extension symbol $c_n$ is given as $$c_n = \sum_{i=0}^{n-1} c_i = (2^m-1)\cdot\lambda = \lambda$$

therefore the extended codeword is also of Type I.

On the other hand, if a codeword in C is of Type II, then it contains all elements of $GF(2^m)$, except one. This may be referred to as missing element δ. The sum of all elements in $GF(2^m)$ is zero $$\delta + \sum_{i=0}^{n-1} c_i = 0$$

and by the definition of the parity symbol $$c_n = \sum_{i=0}^{n-1} c_i \longrightarrow c_n + \sum_{i=0}^{n-1} c_i = 0$$

Therefore $c_n=\delta$, so the extended codeword includes the missing element and then the extended codeword is also Type II. B) is also true for the extended code Ce. The mapping discussed above ensures zero or negative correlation between the preamble codewords.

Embodiments disclosed herein provide some examples of preamble configuration in wireless communication systems. There are other embodiments and implementations. Various disclosed embodiments may be implemented in an AP (or an AN), an AT, and other communication devices. The disclosed examples provide various design components to achieve optimal performance. For instance, OFDM tones for different ATs preambles are almost orthogonal. Reed-Solomon code based tone selection may be implemented to maximize orthogonality between ATs' preambles. OFDM tones used for preamble may be spread across the whole bandwidth to ensure full frequency diversity. Adaptive resource allocation is also achieved, for instance, preamble gain may be adjusted based on DRC feedback (channel conditions). Robust performance is also achieved in that the proposed design is insensitive to channel environment (Doppler, delay profile, etc.) Disclosed embodiments also provide for simple implementation at the transmitter and receiver.

Figure 10:
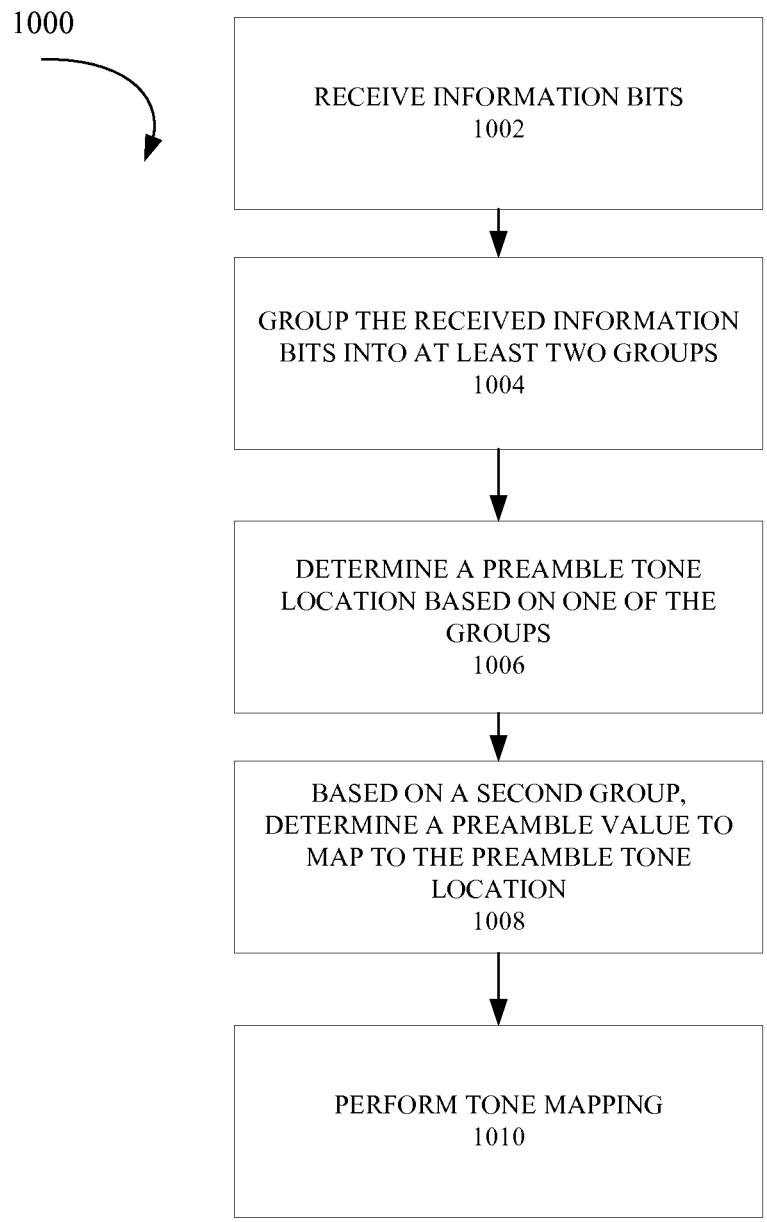
FIG. 10 illustrates an example of a method according to the present disclosure at a transmitter.

At the transmitter, a scheduler first determines the information bits to be included in the preamble. Depending on the chosen encoding scheme, the information bits may be divided into groups and the encoding of each group is carried out. Then the resulting code symbols are combined to generate the preamble. Finally, the preamble is superimposed on the traffic channel by substituting the traffic symbols at the tones in which the preamble symbol power is not zero. This is illustrated in processes 1000, 1100 and 1200 in FIGS. 10, 11 and 12. In FIG. 10 for instance, information bits are determined in

1002. The information bits are grouped into at least two groups in 1004 and encoding is carried out one each group. In 1006, a preamble tone location is determined based on one of the two groups. For instance, the preamble tone location may be determined based on an 8 bit MAC_ID as illustrated in FIG. 5*b*. A preamble value to map to the preamble tone location is determined in 1008, based on a second group. The second group of information bits may comprise a 2 bit compatible rate indicator as illustrated in FIG. 5*b*. Tone mapping is performed in 1010.

Figure 11:
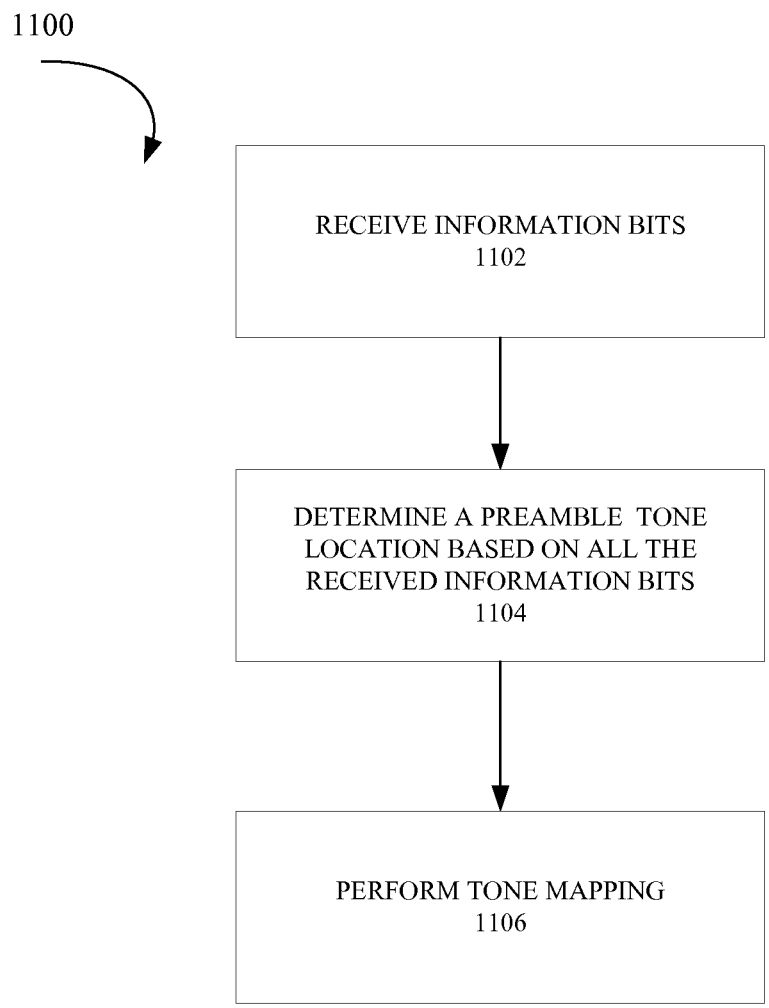
FIG. 11 illustrates an example of another method according to the present disclosure at a transmitter.
Figure 12:
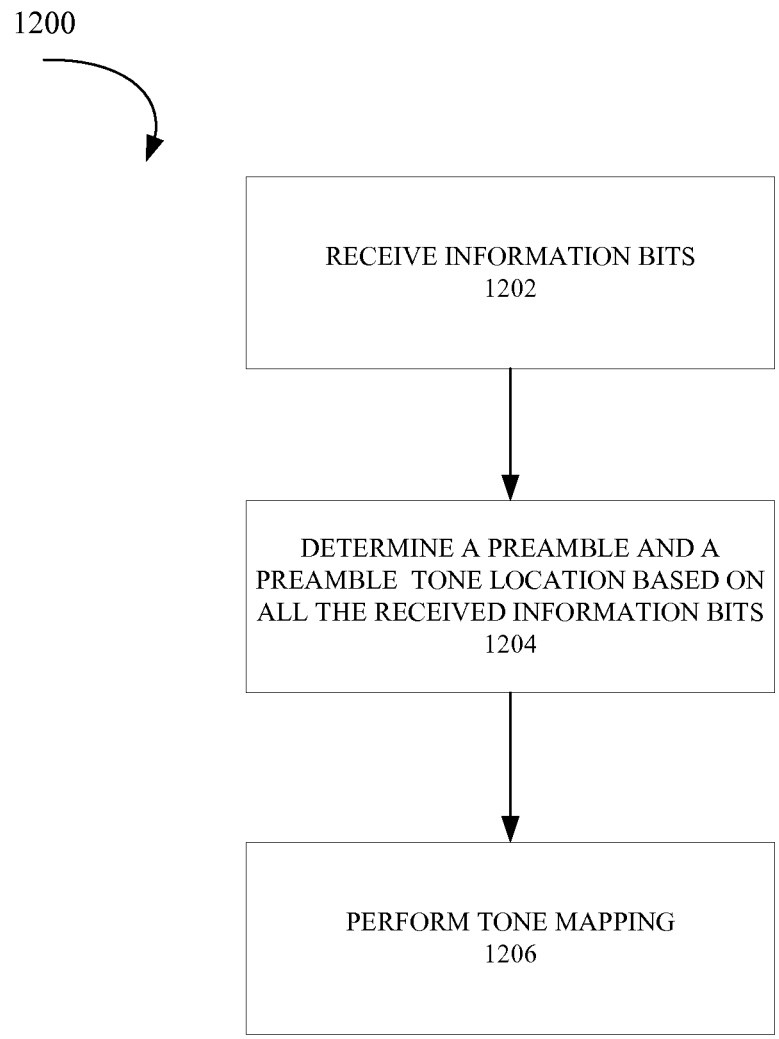
FIG. 12 illustrates an example of yet another method according to the present disclosure at a transmitter.

In FIG. 11, after the information bits to be included in the preamble are determined in 1102, the preamble tone location is determined based on all the information bits. In this scenario for instance, it may be determined tens bits are to be included in the preamble. All ten bits will be used to determine the tone location. Symbols carried on the preamble tones may not explicitly indicate a ten bit preamble frame. Returning to FIG. 11, tone mapping is performed at 1006. Symbols carried on the preamble tones may be some fixed or time-varying sequence to signal information other than a ten bit preamble frame. For instance, the symbols carried on the preamble may indicate an on or off state of the preamble. In FIG. 12, after the information bits to be included in the preamble are determined in 1202, the preamble as well as the tone location is determined based on all the bits. Tone mapping is performed in 1206.

Figure 13:
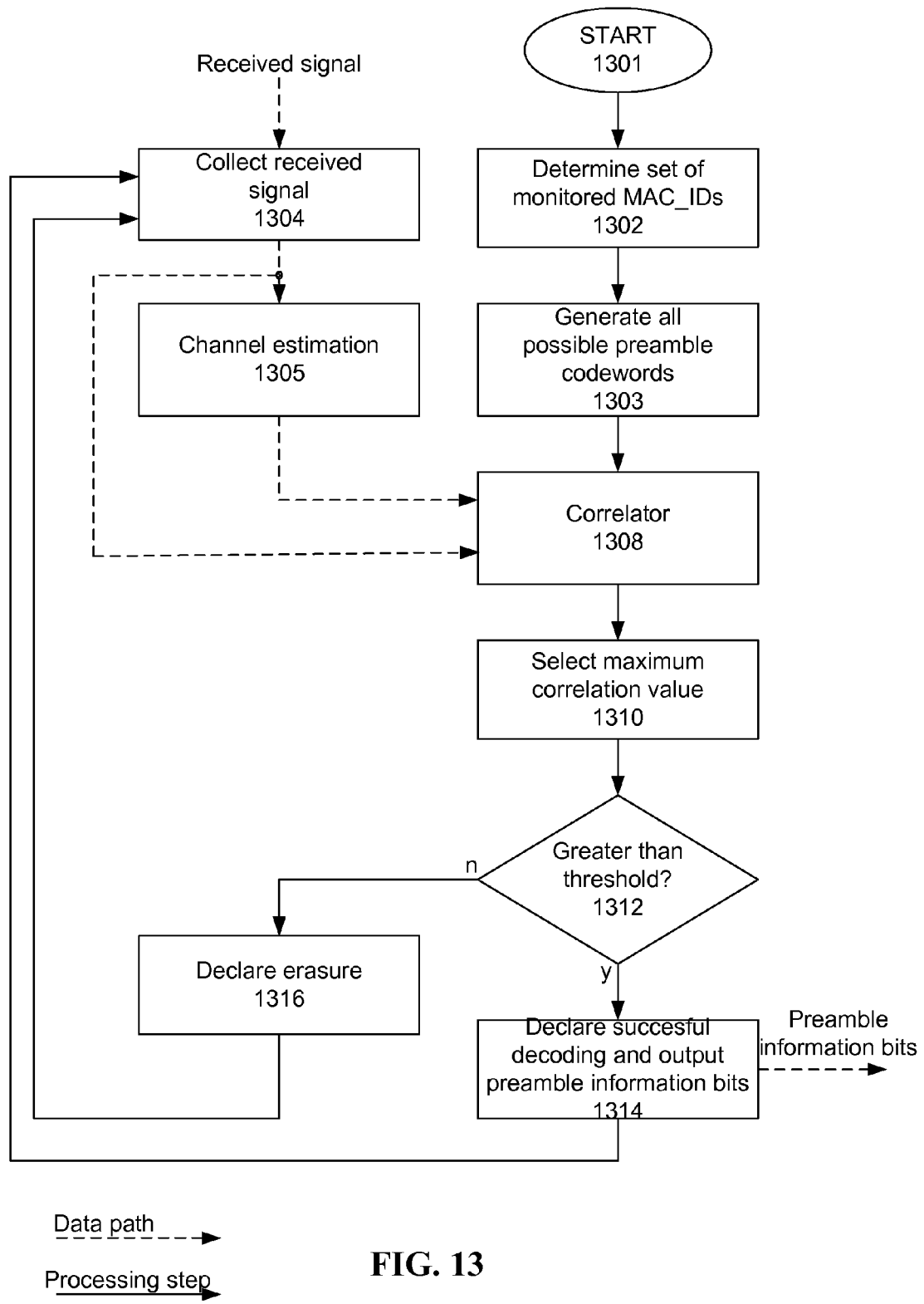
FIG. 13 illustrates an example of a method according to the present disclosure at a receiver.

In the receiver, the AT may first determine the set of all possible preamble code words directed to it and then correlate the received signal with each of those possible preamble codewords. The correlation can be carried out in the frequency domain or equivalently in the time domain. If the maximum correlation value exceeds an appropriately selected threshold, then the decoding is declared successful and the preamble codeword with the maximum correlation is forwarded to the traffic channel decoder. Otherwise, the decoding is declared unsuccessful. The correlation can be carried out coherently if channel estimate is available or non-coherently otherwise. This process at the receiver is illustrated in FIG. 13. The process begins in 1301, and in 1302, a set of monitored MAC_IDs is determined. All possible codewords are generated at 1303. The received signal is collected at 1304 and channel estimation is performed at 1305. At 1308, a correlator correlates the received signal with each of the possible preamble codewords. A maximum correlation value is selected at 1310 and if it is determined in 1312 that a maximum correlation value is exceeded at 1312, an erasure is declared at 1316. If a maximum correlation value is not exceeded at 1312, successful decoding is declared at 1314 and the preamble information bits are output.

Figure 14:
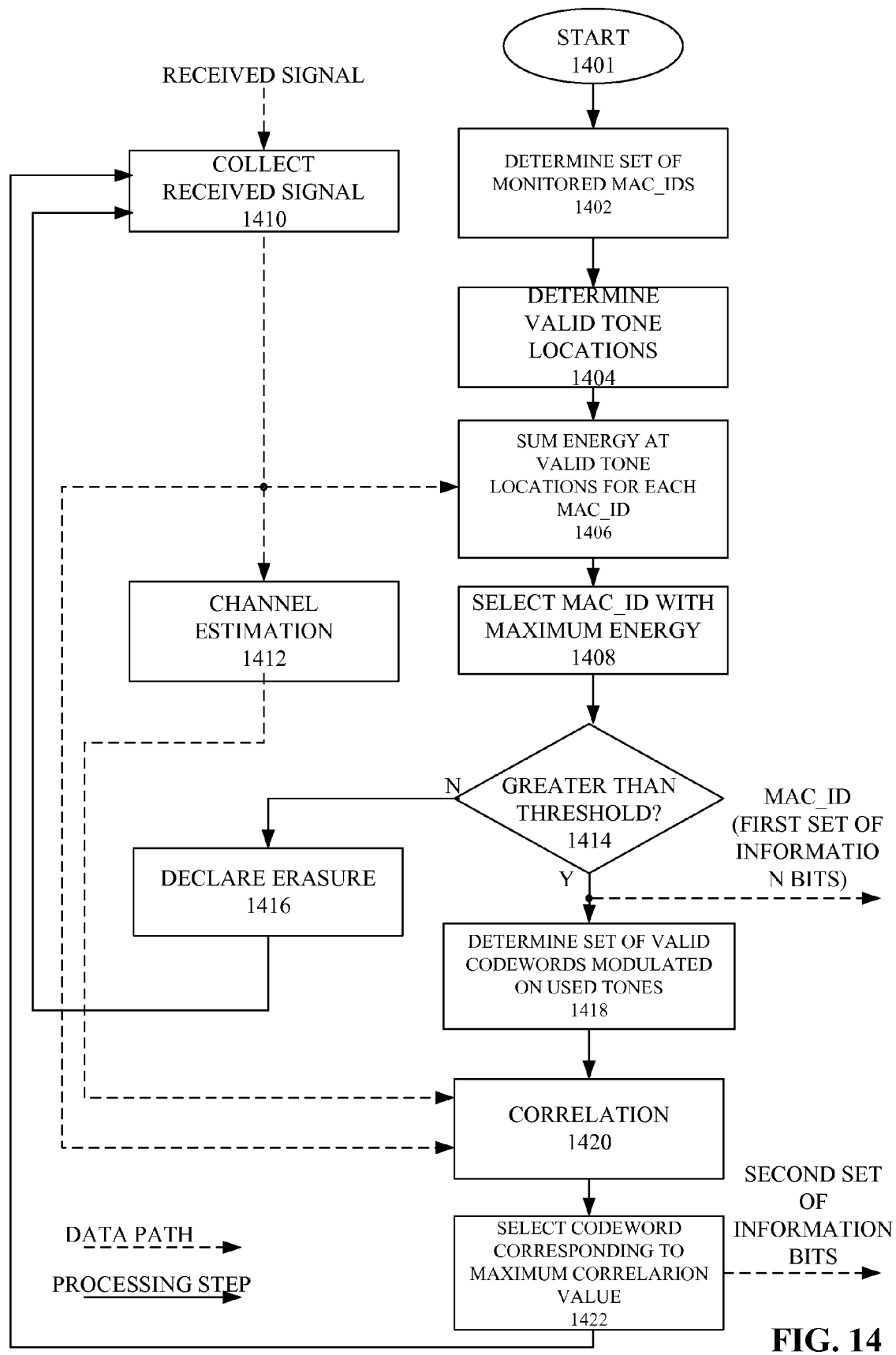
FIG. 14 illustrates an example of another method according to the present disclosure at a receiver.

In another embodiment, preamble detection may be done in the receiver in multiple steps by first decoding a subset of the preamble information bits and then decoding the remaining preamble information bits. For example, as a first step, energy thresholding of the tones corresponding to the receiver's MAC_ID may be carried out and when the threshold criterion is met, the compatible rate field may be decoded by using the modulated symbols on the tones identified in the first step. This multi-step receiver process is applicable, for example, when the encoding structure shown in FIG. 5*b* is used. This is illustrated in FIG. 14. The process starts at 1401. The received signal is collected at 1410 and channel estimation is performed at 1412. In 1402, a first set of information bits or MAC_IDs are monitored and valid tone locations are determined at 1404. MAC_ID with maximum energy is selected at 1408. It is determined if the maximum energy is greater than a threshold at 1414 and if so, the first set of information bits are generated and a valid set of codewords is determined and modulated on the used tones at 1418. This valid set of codewords corresponds to the second set of information bits. Correlation is carried out at 1420 and the codeword corresponding to the maximum correlation value is selected at 1422. This corresponds to the second set of bits. Going back to 1414, if the maximum energy of the selected MAC_ID is less than the threshold, an erasure is declared.

Figure 15:
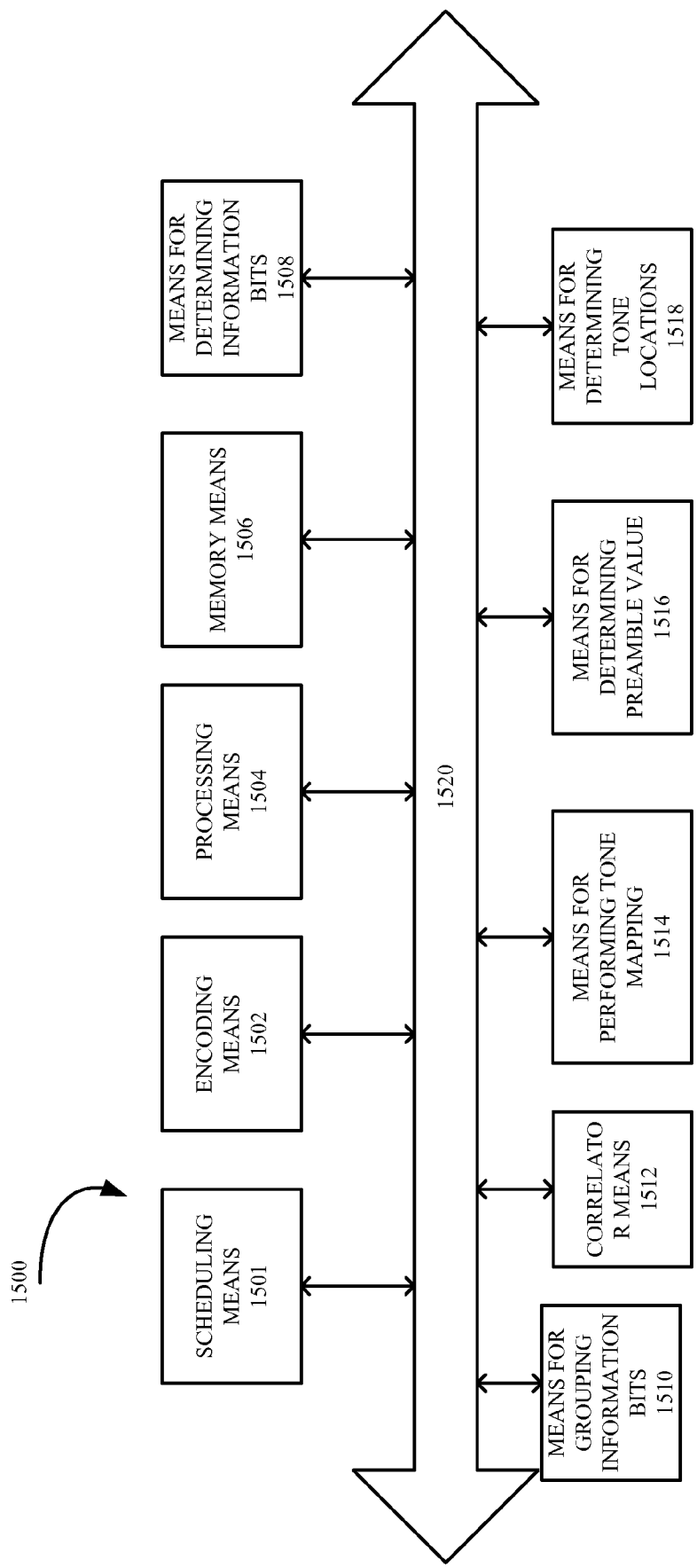
FIG. 15 is a block diagram of a transmitter according to the present disclosure.

FIG. 15 is a block diagram illustrating a transmitter according to one example. Scheduling means 1501, encoding means 1502, processing means 1504, memory means 1506, means for determining information bits 1508, means for grouping information bits 1510, correlator means 1512, means for performing tone mapping 1514, means for determining preamble value 1516 and means for determining tone locations 1518 may be coupled together as shown in the preceding embodiments. In addition they may be coupled together via communication bus 1520 shown in FIG. 15.

Figure 16:
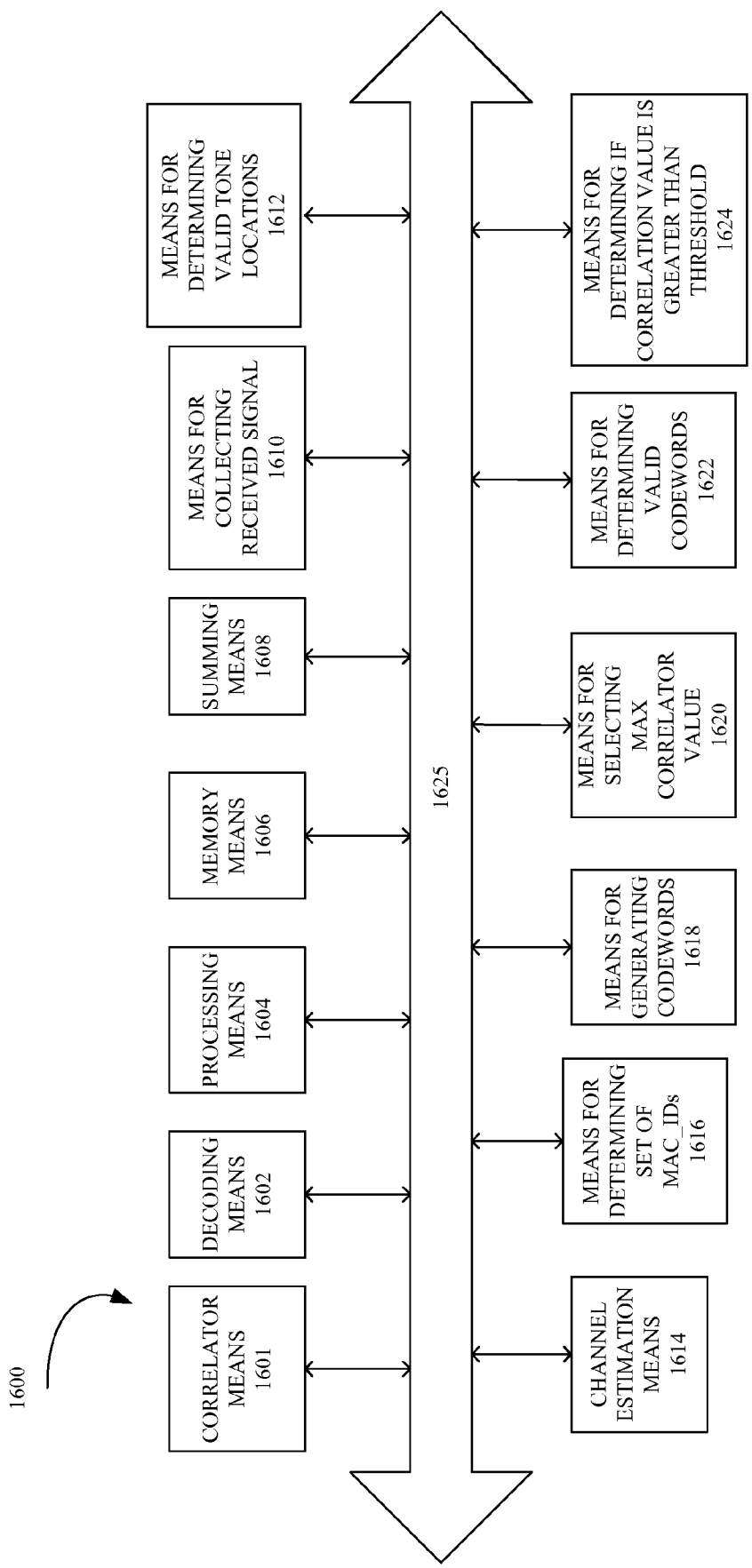
FIG. 16 is a block diagram of a receiver according to the present disclosure.

FIG. 16 is a block diagram illustrating a receiver according to one example. Correlator means 1601, decoding means 1602, processing means 1604, memory means 1606, summing means 1608, means for collecting received signal 1610, means for determining valid tone locations 1612, channel estimation means 1614, means for determining set of MAC_IDs 1616, means for generating codewords 1618, means for selecting max correlator value 1620, means for determining valid codewords 1622 and means for determining if correlation value is greater than threshold 1624 may be coupled together as shown in the preceding embodiments. In addition they may be coupled together via communication bus 1625 shown in FIG. 16.

Various units/modules and embodiments disclosed herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or processing unit). The memory unit may be implemented within the processor or external to the processor, in which case it can be communicatively coupled to the processor via various means known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communications, the method using time slots, each time slot having two half-slots, for transmitting signals, each half-slot having a number of tiles, each tile having a number of tones, the method being implemented by a communication device comprising a processor, the method comprising:
receiving a plurality of information bits;
grouping the plurality of information bits into a first group and a second group;
encoding, via the processor, the first group using an error control code to obtain a plurality of code symbols $s_i$;
determining a location of each of a plurality of tones in the number of tiles based on the plurality of code symbols $s_i$ to obtain a plurality of selected tones;
encoding the second group to obtain a plurality of modulation symbols; and
mapping the plurality of modulation symbols onto the plurality of selected tones.

2. The method as in claim 1, wherein the error control code comprises Reed-Solomon encoding.

3. The method as in claim 1, wherein the error control code comprises extended Reed-Solomon encoding.

4. The method as in claim 3, wherein the extended Reed-Solomon encoding comprises code symbol repetition or puncturing.

5. The method as in claim 1, wherein encoding the second group comprises code symbol repetition or puncturing.

6. The method as in claim 1, wherein the error control code comprises pseudorandom encoding.

7. The method as in claim 6, further comprising:
mapping the plurality of code symbols $s_i$ to a tone location within a tile.

8. The method as in claim 7, wherein the tile comprises contiguous tones.

9. The method as in claim 1, further comprising:
determining a modulation of at least one tone, wherein the modulation comprises Reed-Solomon encoding; and
mapping the plurality of code symbols $s_i$ to a plurality of information element pairs, wherein each pair comprises a tone location and a symbol modulated on the at least one tone.

10. The method as in claim 1, wherein the error control code comprises Reed-Solomon encoding, and further comprising:
determining a modulation of used tones, the modulation comprising Reed-Solomon encoding;
mapping the plurality of code symbols $s_i$ to an associated pair of tone location and modulation symbol;
mapping two code symbols to one tone location; and
mapping the two code symbols to two different modulation symbols, wherein a sum of the two code symbols mapped to a same tone is a constant in a finite field.

11. The method of claim 1, wherein an index i of the plurality of code symbols $s_i$ indicates a tile in which a tone is located.

12. The method of claim 1, further comprising transmitting the plurality of modulation symbols on the plurality of selected tones.

13. An apparatus for wireless communications, the apparatus using time slots, each time slot having two half-slots, for transmitting signals, each half-slot having a number of tiles, each tile having a number of tones, comprising:
- means for receiving a plurality of information bits;
- means for grouping the plurality of information bits into a first group and a second group;
- means for encoding the first group using an error control code to obtain a plurality of code symbols $s_i$;
- means for determining a location of each of a plurality of tones in the number of tiles based on the plurality of code symbols $s_i$ to obtain a plurality of selected tones;
- means for encoding the second group to obtain a plurality of modulation symbols; and
- means for mapping the plurality of modulation symbols onto the plurality of selected tones.

14. The apparatus as in claim 13, wherein the error control code comprises means for Reed-Solomon encoding.

15. The apparatus as in claim 13, wherein the error control code comprises means for extended Reed-Solomon encoding.

16. A computer program product, comprising:
a non-transitory computer-readable medium comprising:
- code for causing a computer to receive a plurality of information bits;
- code for causing a computer to group the information bits into a first group and a second group;
- code for encoding the first group using an error control code to obtain a plurality of code symbols $s_i$;
- code for causing a computer to determine a location of each of a plurality of tones in a number of tiles, each tile having a number of tones, based on the code symbols $s_i$ to obtain a plurality of selected tones;
- code for causing a computer to encode the second group to obtain a plurality of modulation symbols; and
- code for causing a computer to map the plurality of modulation symbols onto the selected tones.

17. An apparatus for wireless communication, the apparatus using time slots, each time slot having two half-slots, for transmitting signals, each half-slot having a number of tiles, each tile having a number of tones, comprising:
a processor configure to:
- receive a plurality of information bits;
- group the plurality of information bits into a first group and a second group;
- encode the first group using an error control code to obtain a plurality of code symbols $s_i$;
- determine a location of each of a plurality of tones in the number of tiles based on the plurality of code symbols $s_i$ to obtain a plurality of selected tones;
- encode the second group to obtain a plurality of modulation symbols; and
- map the plurality of modulation symbols onto the plurality of selected tones; and a memory in communication with the processor.

18. The apparatus of claim 17, wherein an index i of the plurality of code symbols $s_i$ indicates a tile in which a tone is located.

19. The apparatus of claim 17, further comprising transmitting the plurality of modulation symbols on the plurality of selected tones.

20. The apparatus of claim 17, wherein the error control code comprises Reed-Solomon encoding.

21. The apparatus of claim 17, wherein the error control code comprises extended Reed-Solomon encoding.

22. The apparatus of claim 21, wherein the extended Reed-Solomon encoding comprises code symbol repetition or puncturing.

23. The apparatus of claim 17, wherein encoding the second group comprises code symbol repetition or puncturing.

* * * * *

UNITED STATES PATENT AND TRADEMARK OFFICE
CERTIFICATE OF CORRECTION

PATENT NO. : 8,516,350 B2
APPLICATION NO. : 11/830712
DATED : August 20, 2013
INVENTOR(S) : Peter Gaal et al.

Page 1 of 1

It is certified that error appears in the above-identified patent and that said Letters Patent is hereby corrected as shown below:

On The Title Page, Item (75) 3rd Inventor Name: "Sind Naga Bhushan" to read as --Naga Bushan--

Signed and Sealed this
Twenty-sixth Day of May, 2015

Michelle K. Lee
*Director of the United States Patent and Trademark Office*